(12) United States Patent
Chiaki (10) Patent No.: US 8,594,454 B2
(45) Date of Patent: Nov. 26, 2013

(54) IMAGE PRODUCTION DEVICE, REPRODUCTION DEVICE, REPRODUCTION SYSTEM, IMAGE PRODUCTION METHOD, AND REPRODUCTION METHOD

(75) Inventor: Hisako Chiaki, Nara (JP)

(73) Assignee: Panasonic Corporation, Osaka (JP)

( * ) Notice: Subject to any disclaimer, the term of this patent is extended or adjusted under 35 U.S.C. 154(b) by 479 days.

(21) Appl. No.: 12/897,132

(22) Filed: Oct. 4, 2010

(65) Prior Publication Data

US 2011/0081097 A1    Apr. 7, 2011

(30) Foreign Application Priority Data

Oct. 6, 2009 (JP) .................................. 2009-232345
Oct. 6, 2009 (JP) .................................. 2009-232346

(51) Int. Cl.
*G06K 9/40* (2006.01)
(52) U.S. Cl.
USPC .......................................................... 382/274
(58) Field of Classification Search
USPC ......................................... 382/274, 276, 100
See application file for complete search history.

(56) References Cited

U.S. PATENT DOCUMENTS

| | | | | |
|---|---|---|---|---|
| 7,038,736 | B2 * | 5/2006 | Tojo ................................ | 348/700 |
| 7,551,797 | B2 * | 6/2009 | Dorrell et al. .................. | 382/274 |
| 7,894,666 | B2 * | 2/2011 | Mitarai et al. .................. | 382/167 |
| 2005/0174448 | A1 | 8/2005 | Kuboi | |
| 2007/0120986 | A1 | 5/2007 | Nunomaki | |
| 2008/0131007 | A1 * | 6/2008 | Kutka .............................. | 382/232 |
| 2008/0211938 | A1 | 9/2008 | Kuboi | |
| 2009/0245685 | A1 * | 10/2009 | Makii .............................. | 382/276 |
| 2010/0091113 | A1 | 4/2010 | Morioka et al. | |
| 2013/0044199 | A1 * | 2/2013 | Nanu et al. ...................... | 348/78 |

FOREIGN PATENT DOCUMENTS

| | | |
|---|---|---|
| JP | 5-37896 | 2/1993 |
| JP | 5-166297 | 7/1993 |
| JP | 2004-236115 | 8/2004 |
| JP | 2005-223858 | 8/2005 |
| JP | 2007-134770 | 5/2007 |
| JP | 2007-306225 | 11/2007 |
| JP | 2008-227860 | 9/2008 |
| JP | 2009-141717 | 6/2009 |

* cited by examiner

*Primary Examiner* — Yon Couso
(74) *Attorney, Agent, or Firm* — Wenderoth, Lind & Ponack, L.L.P.

(57) ABSTRACT

An image production device includes a flash determination section, a frame information adder and an addition controller. The flash determination section is configured to determine whether or not image data included in an image data group are affected by flash. The frame information adder is configured to add frame information used for identifying the image data affected by flash to the image data. The addition controller is configured to control the frame information adder to add the frame information to the image data affected by flash, on the basis of the determination result of the flash determination section.

9 Claims, 5 Drawing Sheets

IMAGE PRODUCTION DEVICE, REPRODUCTION DEVICE, REPRODUCTION SYSTEM, IMAGE PRODUCTION METHOD, AND REPRODUCTION METHOD

CROSS-REFERENCE TO RELATED APPLICATIONS

This application claims priority under 35 U.S.C. §119 to Japanese Patent Application No. 2009-232345 filed on Oct. 6, 2009, and Japanese Patent Application No. 2009-232346 filed on Oct. 6, 2009. The entire disclosures of Japanese Patent Applications No. 2009-232345 and No. 2009-232346 are hereby incorporated herein by reference.

BACKGROUND

1. Technical Field

The technology disclosed herein relates to an image production device, a reproduction device, a reproduction system, an image production method, and a reproduction method.

2. Background Information

When imaging is performed with an imaging device featuring a CMOS (complementary metal oxide semiconductor) that read out data for every horizontal line, the charge storage time in the CMOS has varied with each horizontal line, for example. Therefore, when an image of a subject is captured with this imaging device, images of different times are captured in the upper and lower portions of a single image. Actually, in most cases the image is read at times continuously from the upper portion to the lower portion, and as long as there is little change in the movement of the subject, there is almost no unnaturalness when a single image is viewed. Nor is there much unnaturalness when viewing a moving picture captured continuously with a video camera.

SUMMARY

An image production device disclosed herein includes a flash determination section, a frame information adder and an addition controller. The flash determination section is configured to determine whether or not image data included in an image data group are affected by flash. The frame information adder is configured to add frame information used for identifying the image data affected by flash to the image data. The addition controller is configured to control the frame information adder to add the frame information to the image data affected by flash, on the basis of the determination result of the flash determination section.

A reproduction device disclosed herein includes a frame information detector and a signal processor. The frame information detector is configured to detect, from image data included in an image data group, frame information indicating that the image data is affected by flash. The signal processor is configured to perform specific processing on image data to which the frame information is added.

A reproduction system disclosed herein includes an image production device and the reproduction device. The image production device includes a flash determination section, a frame information adder and an addition controller. The flash determination section is configured to determine whether or not image data included in an image data group are affected by flash. The frame information adder is configured to add frame information for identifying the image data affected by flash to the image data. The addition controller is configured to control the frame information adder to add the frame information to the image data affected by flash, on the basis of the determination result of the flash determination section.

An image production method disclosed herein includes determining with a flash determination section whether or not image data included in an image data group are affected by flash, and adding frame information, for identifying the image data affected by flash, to the image data with a frame information adder.

A reproduction method disclosed herein includes detecting, with a frame information detector, frame information indicating that image data is affected by flash, and performing specific processing with a signal processor on image data to which the frame information is added.

BRIEF DESCRIPTION OF DRAWINGS

Referring now to the attached drawings which form a part of this original disclosure.

DETAILED DESCRIPTION OF INVENTION

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Configuration of Imaging Device

Figure 1:
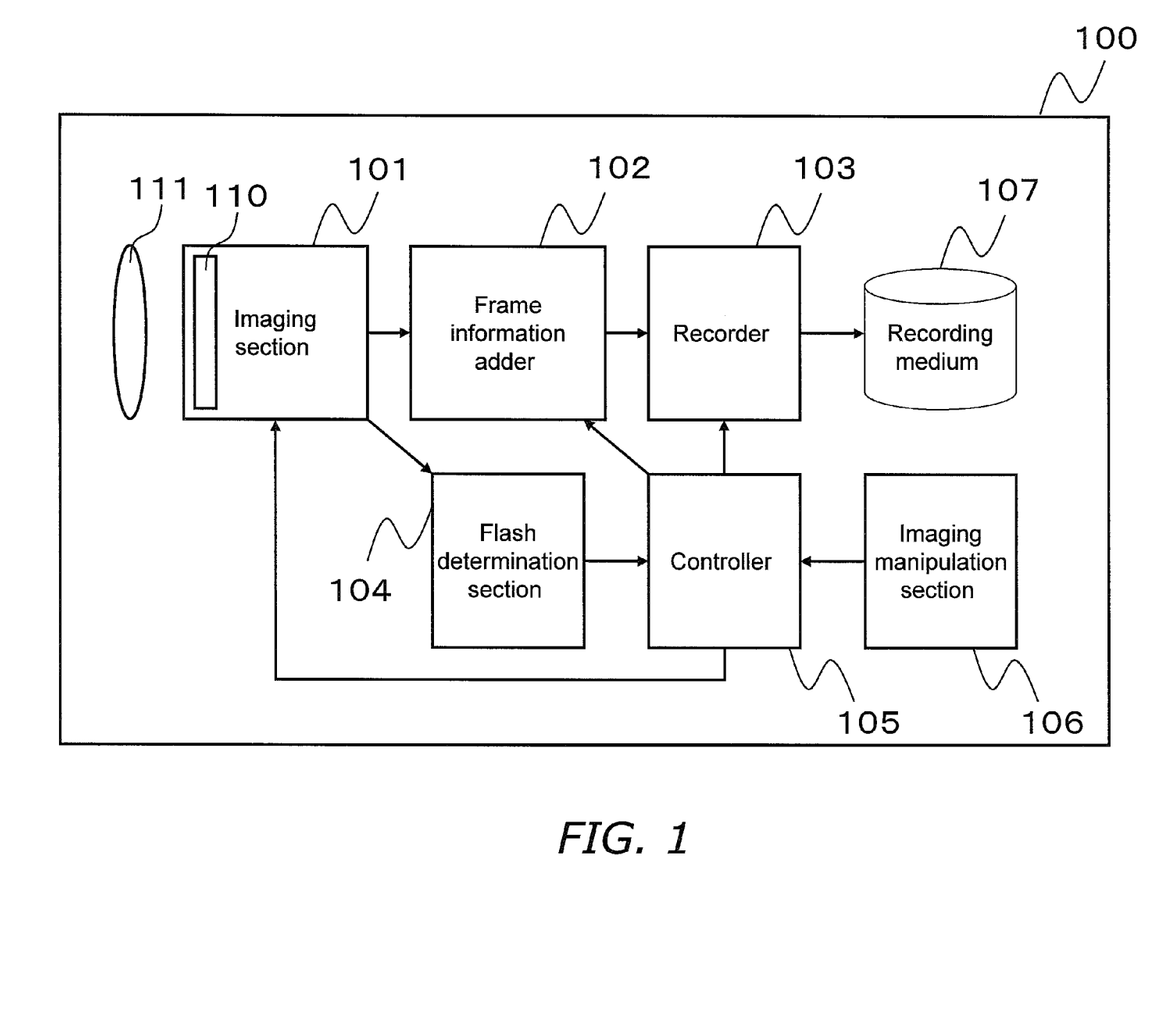
FIG. 1 is a block diagram of the configuration of an imaging device.

An imaging device 100 (an example of an image production device) is a video camera that captures moving pictures, for example, and comprises an optical system 111, an imaging section 101, a frame information adder 102, a recorder 103, a flash determination section 104, a controller 105, and an imaging operation section 106.

The optical system 111 forms an optical image of a subject.

The imaging section 101 (an example of an imaging section) has an imaging element 110 (an example of an imaging element) whose charge storage time varies with the region within one frame of image. In this embodiment, the charge storage time of the imaging element 110 varies for every horizontal line, for example. Here, the "charge storage time" means the time at which the storage of a charge is begun. The imaging element 110 is a CMOS image sensor, for example, converts light incident from the subject through the optical system 111 into an electrical signal, and outputs a plurality of frames of image data as an image data group. When a moving picture is captured, the imaging element 110 sequentially outputs image data at a specific period. The image data group outputted from the imaging element 110 includes a plurality of frames of image data.

The flash determination section 104 (an example of a flash determination section) determines whether or not the plurality of sets of image data outputted from the imaging section 101 are subjected to the effect of flash (more precisely, a detrimental flash effect) from the imaging device 100 and a device other than the imaging device 100, and outputs the determination result to the controller 105. Here, the concept of image data affected by flash (more precisely, image data that is adversely affected by flash) is one that refers to image data in which part of the display image has blown-out highlights due to flash. Also, "flash" includes flash from the imaging device 100 and/or flash from a device other than the imaging device 100.

The flash determination section 104 determines whether or not image data is affected by flash. If a flash is lit by a surrounding image data during moving picture capture, this flash can cause the upper or lower region of the image than a specific line to be blown out highlights, and there is a corresponding surge in the brightness of the image data for one or more frames. Therefore, in this determination, the flash determination section 104 compares the brightness of the same pixel positions (the same regions) between adjacent frames. For example, let us assume that an image data group includes first image data and second image data corresponding to two adjacent frames. In this case, for example, the flash determination section 104 determines whether or not the second image data is affected by flash by comparing the brightness of the same regions in the first and second image data.

The frame information adder 102 (an example of a frame information adder) performs the addition of frame information as needed to image data outputted from the imaging section 101. More specifically, the frame information adder 102 adds frame information for identifying a frame affected by flash to an image data group. The frame information is a flag, for example. In this embodiment, the frame information adder 102 adds frame information to a specific region within the image data affected by flash. Here, the specific region is a non-display region (a region not used for a display image; an example of a specific region) that is different from the active display region used for the display image, and can be a region established by standard ahead of time in order to record addition information related to a frame, for example.

The configuration can be such that the frame information adder 102 adds frame information to the image data by superposing frame information over the active display region. In this case, as with a digital watermark, for example, the frame information adder 102 can add a signal indicating that the image data is affected by flash to the active display region (an example of a specific region) of the image data.

The recorder 103 (an example of a recorder) performs coding and other such processing as needed on image data outputted from the frame information adder 102, and records the processed image data to a recording medium 107. More precisely, the recorder 103 records to the recording medium 107 an image data group to which frame information is added by the frame information adder 102. Examples of the recording medium 107 include a hard disk drive, an optical disk, and a flash memory.

The imaging operation section 106 receives user instructions, such as start or end recording, and outputs this instruction information.

The controller 105 (an example of an addition controller) controls the sections of the imaging device 100 (namely, the imaging section 101, the frame information adder 102, and the recorder 103) on the basis of the determination result outputted from the imaging operation section 106. In particular, the controller 105 controls the frame information adder 102 to add frame information to image data affected by flash, on the basis of the determination result of the flash determination section 104.

Instead of a configuration in which the recorder 103 records image data to the recording medium 107, a configuration may be employed in which the produced image data is outputted to somewhere outside the imaging device 100 (transmitted to another device).

Configuration of Reproduction Device

Figure 2:
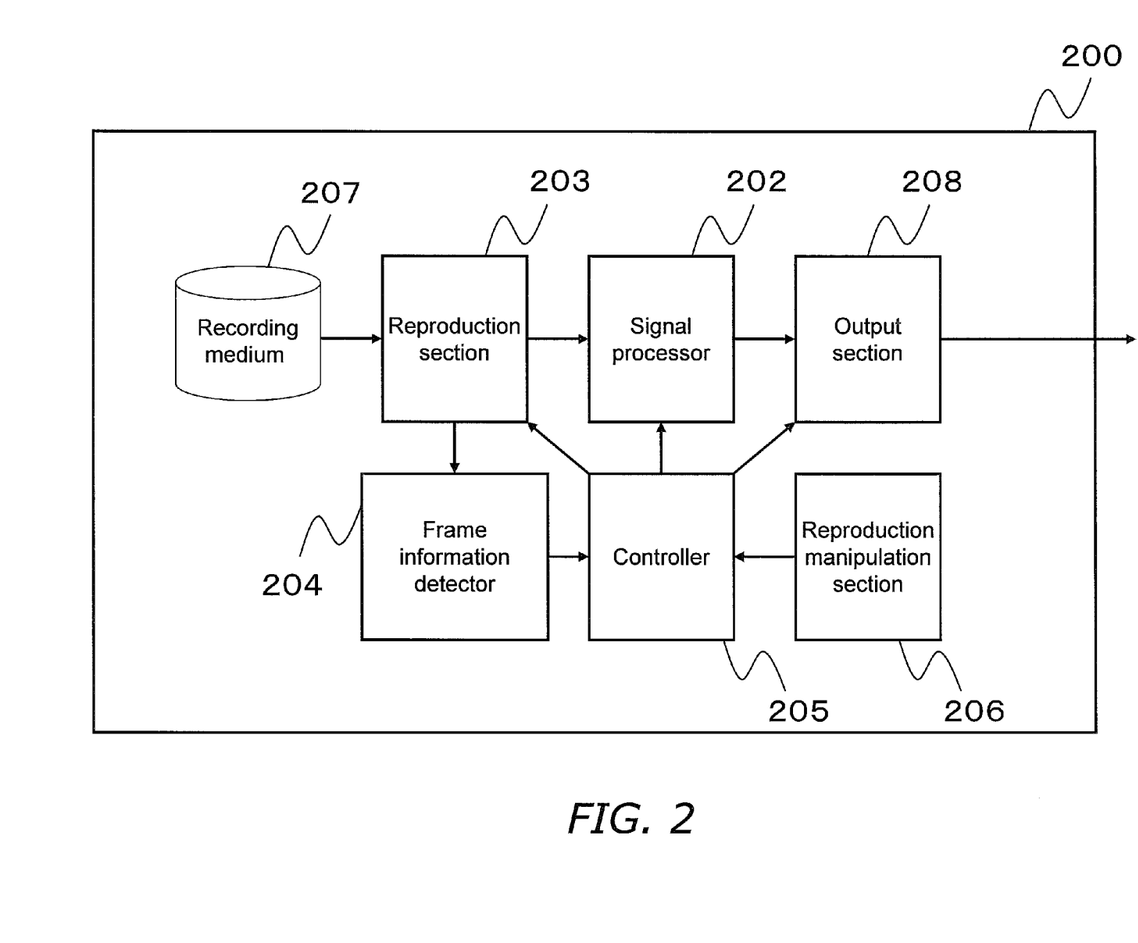
FIG. 2 is a block diagram of the configuration of a reproduction device.

As shown in FIG. 2, a reproduction device 200 comprises a reproduction section 203, a frame information detector 204, a signal processor 202, a controller 205, a reproduction operation section 206, and an output section 208.

The reproduction section 203 performs decoding or other such processing as needed on the image data read from a recording medium 207 (a hard disk drive, optical disk, flash memory, etc.), and then outputs the processed image data.

The frame information detector 204 detects, from an inputted image data group, frame information indicating that the image data is affected by flash. In other words, the frame information detector 204 detects frame information that was pre-added to image data outputted from the reproduction section 203, and outputs the detection result. More specifically, the frame information detector 204 detects frame information that is added to a specific region within the image data for each frame. In this embodiment, the frame information detector 204 detects frame information added to a non-display region that is different from the active display region used for a display image. If there is no frame information in the specific region within the image data, the frame information detector 204 determines that the image data in question has not been affected by flash. If the image data has not been affected by flash, then frame information indicating this may be added to a specific region within the image data. The frame information detector 204 may also detect frame information superposed over the active display region, rather than the inactive display region.

The signal processor 202 (an example of a signal processor) performs specific processing on image data to which frame information is added. The signal processor 202 performs correction processing or other such signal processing as needed on the image data outputted from the reproduction section 203, and outputs the result. More specifically, the signal processor 202 performs correction processing for reducing how pronounced the effect of flash is on the affected image data during reproduction, when the operation information indicates special reproduction and the detection result from the frame information detector 204 indicates that the image data is affected by flash. An example of this correction processing is a method in which a frame that is adversely affected is replaced with the immediately prior frame that has not been adversely affected. Alternatively, the usable portion of the image data may be trimmed and used as a still picture, or a blown-out highlights region may be subjected to some kind of image processing during reproduction. These are other possible correction methods. Also, image data affected by flash can be subjected to correction processing during reproduction regardless of whether the reproduction is ordinary or special.

The term "special reproduction" here means a reproduction method in which it takes a relatively long time to display one frame, examples including pause mode, frame advance mode, and slow motion mode. These reproduction methods (an example of a first reproduction method) can be defined as a reproduction method in which an inputted image data group is reproduced by increasing the time width over the frame time width during image capture. The term "special reproduction" also encompasses a case in which an image captured in slow motion is reproduced at that same speed. This reproduction method (an example of a second reproduction method) can be defined as a reproduction method in which an image data group whose frame time width during image capture is greater than the normal time width is reproduced without changing the time width.

The output section 208 outputs to the outside the image data outputted by the signal processor 202. Examples of the output destination include a display device and another image processing device.

The reproduction operation section 206 (an example of a operation section) receives user instructions, such as the start or end of reproduction, or search condition settings, and outputs this instruction information. The reproduction operation section 206 accepts reproduction mode settings from the user and outputs them as instruction information.

The controller 205 controls the various sections (namely, the reproduction section 203, the signal processor 202, and the output section 208) of the reproduction device 200 on the basis of instruction information and detection results. More specifically, the controller 205 controls the signal processor 202 on the basis of detection results, and causes the corresponding image data to be subjected to correction processing or the like. Also, the controller 205 controls the output method and read method for image data read from the recording medium 207 by the reproduction section 203 according the reproduction mode included in the instruction information, and controls the signal processing method at the signal processor 202 according to detection results.

The image data can be input into the reproduction section 203 from outside the reproduction device 200 (transmitted from another device) rather than that the image data is read from the recording medium 207.

Figure 3:
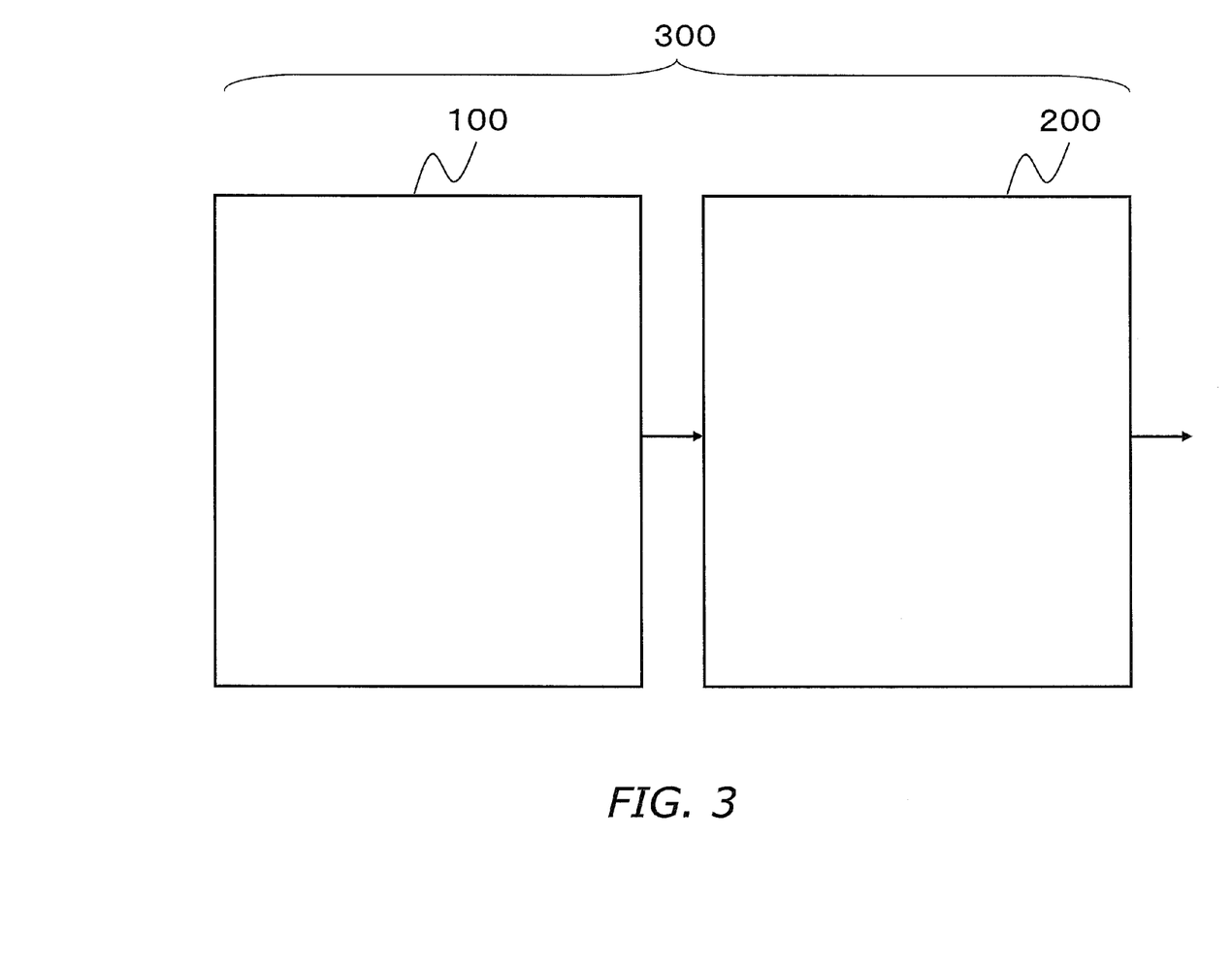
FIG. 3 is a block diagram of the configuration of a reproduction system.

As shown in FIG. 3, a reproduction system 300 is constituted by the imaging device 100 and reproduction device 200 described above.

Operation of Imaging Device

Figure 4:
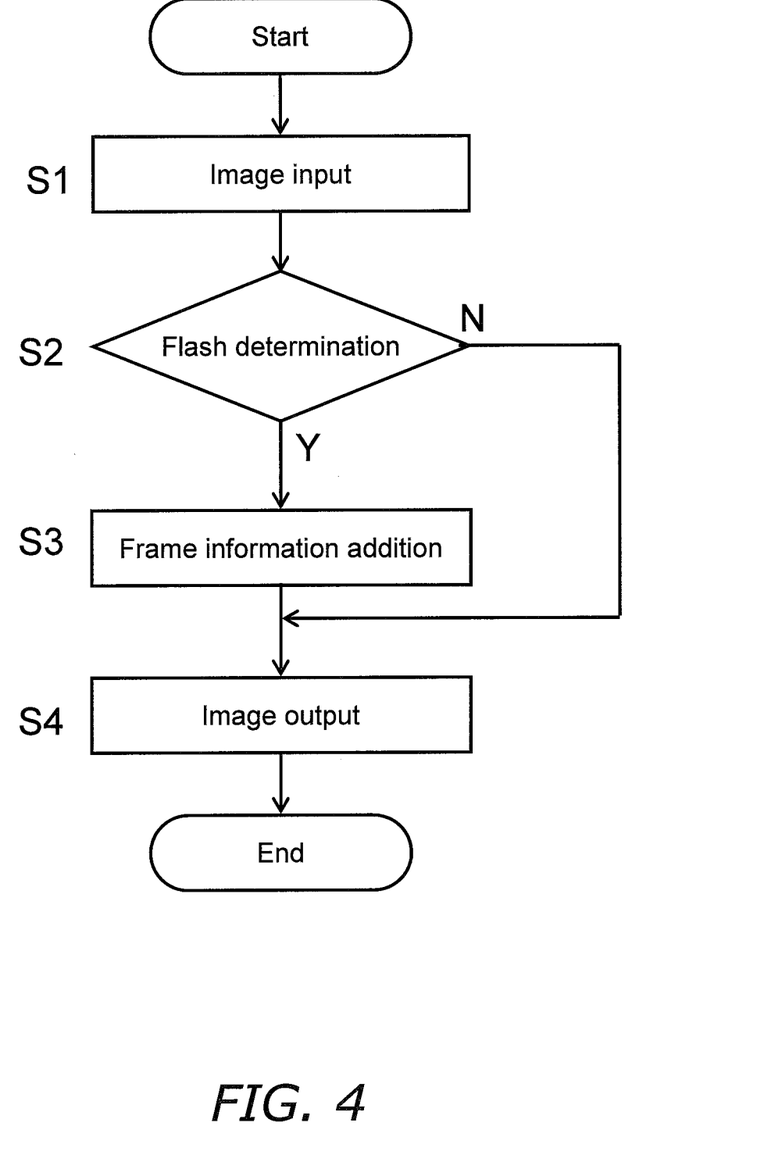
FIG. 4 is a flowchart of the operation of an imaging device during recording.

FIG. 4 is a flowchart of the flash detection operation during recording with the imaging device 100. As shown in FIG. 4, when image data acquired by the imaging section 101 is inputted to the flash determination section 104 (image input step S1), the flash determination section 104 determines whether or not the inputted image data is affected by flash (flash determination step S2). Whether or not the image data is affected by flash (that is, whether or not the image was captured at the instant the flash is emitted) may be determined by comparing the brightness at the same pixel positions between adjacent frames, for example. When a flash is emitted, there is a sharp rise in the brightness in a partial region of the image, but only in a frame acquired at that instant (or only in a few consecutive frames). Therefore, whether or not the image data in question is affected by flash can be determined by comparing the change in brightness at the same pixel positions of a few frames.

Information (frame information) indicating that image data is affected by flash is added by the frame information adder 102 to such image data on the basis of the determination result of the flash determination section 104 (frame information addition step S3). That frame information is added to image data can also be thought of as frame information being associated with image data. More precisely, it is possible that a flag or other such signal is embedded as frame information outside the active display region of the image data, as discussed above, for example.

Frame information is embedded as above in image data that is affected by flash, or image data for which no frame information was detected is left alone and sequentially recorded to the recording medium 107 by the recorder 103 (image output step S4).

Operation of Reproduction Device

Figure 5:
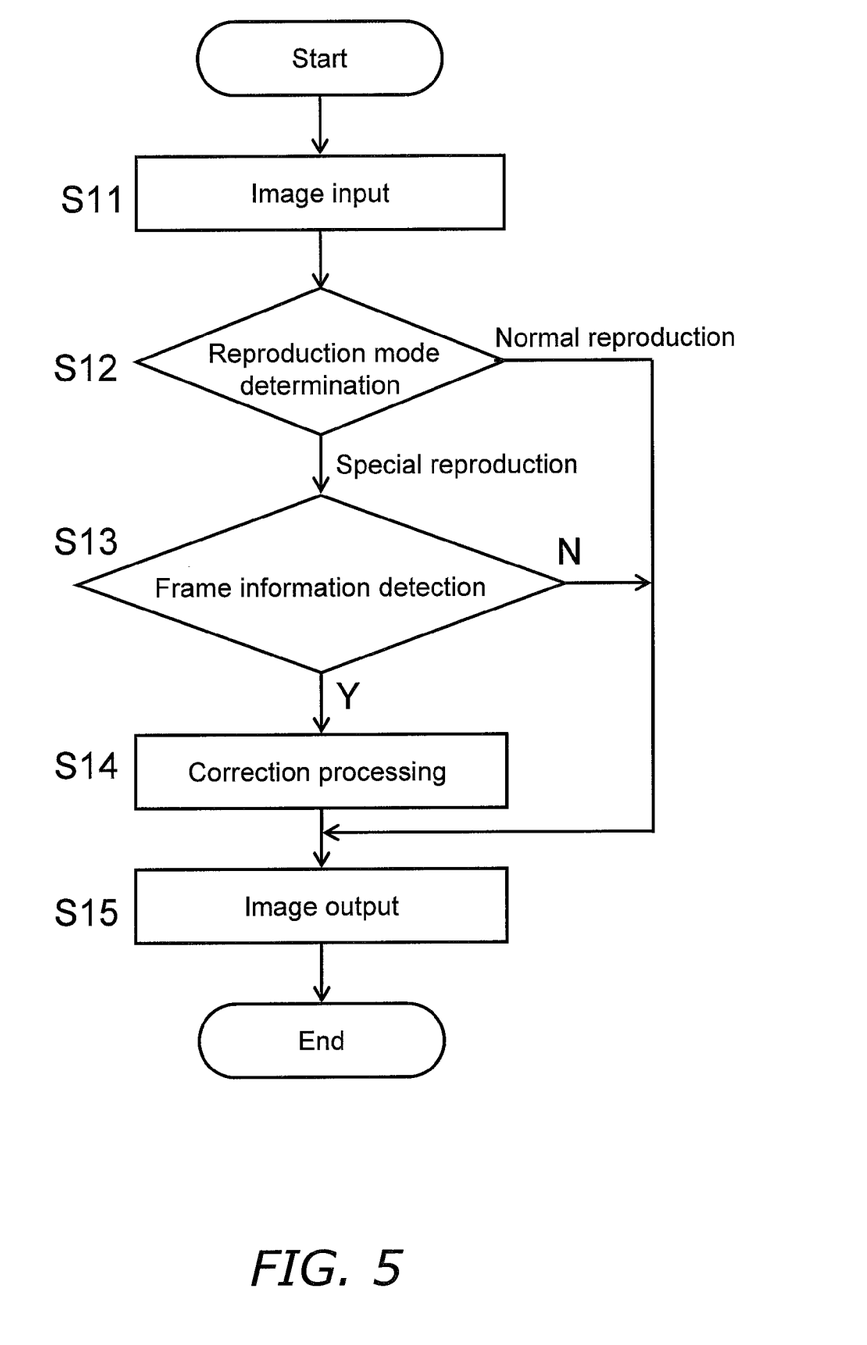
FIG. 5 is a flowchart of the operation of a reproduction device during reproduction.

FIG. 5 is a flowchart of the operation of the reproduction device 200 during reproduction. We will assume that an image data group recorded by the imaging device 100 is recorded to the recording medium 207. As shown in FIG. 5, the reproduction operation section 206 is operated by the user to specify reproduction mode and start reproduction, or to set the reproduction mode during reproduction. Once reproduction starts, the image data recorded to the recording medium 207 by the reproduction section 203 is sequentially read out (image input step S11). If the reproduction mode specified by the user is normal reproduction ("normal reproduction" in the reproduction mode decision step S12), the image data outputted from the reproduction section 203 is subjected to normal signal processing by the signal processor 202, and outputted from the output section 208 (image output step S15). As a result, the image data group is reproduced normally.

On the other hand, if the image data group (moving picture) is subjected to special reproduction such as pausing or slow motion reproduction ("special reproduction" in the reproduction mode decision step S12), the image data read out from the recording medium 207 is outputted a plurality of times by the reproduction section 203. For instance, in slow motion reproduction at one-half the normal speed, one frame of image data is outputted twice by the reproduction section 203. This can be rephrased by saying that the time width in reproduction is increased over the frame time width when the image was captured.

When special reproduction is performed, the frame information detector 204 detects frame information indicating that the image data is affected by flash (frame information detection step S13). More specifically, the frame information detector 204 detects frame information added to the image data for each frame. For example, the frame information detector 204 detects whether or not frame information is included in a specific region within the image data. If frame information is included in this specific region, it is determined by the frame information detector 204 that the image data is affected by flash. On the other hand, if frame information is not included in the specific region, it is determined by the frame information detector 204 that the image data has not been affected by flash. The frame information detector 204 may detected frame information that is superposed over the image region produced by the imaging element 110. More specifically, the configuration may be such that a signal is embedded as frame information in the active display region of the image by a digital watermark or the like, and the frame information detector 204 detects this embedded signal.

If the frame information detector 204 does not detect frame information from the image data ("No" in the frame information detection step S13), the image data is subjected to normal signal processing by the signal processor 202, and the image data thus processed is outputted from the output section 208 (image output step S15). Consequently, image data that has not been affected by flash is used in special reproduction after undergoing normal signal processing.

Meanwhile, if the frame information detector 204 has detected frame information from the image data ("yes" in the frame information detection step S13), the image data for special reproduction outputted from the reproduction section 203 is subjected to correction processing for reducing how pronounced the flash effect is during reproduction, in addition to the normal signal processing performed by the signal processor 202 (correction processing step S14). Possible correction processing includes processing in which image data for a frame to which frame information is added is replaced with image data for the immediately prior frame to which frame information has not been added, and brightness correction processing intended to reduce or eliminate the adverse effect of flash on image data to which frame information is added. The image data that has undergone correction processing is outputted from the output section 208 (image output step S15). When a moving picture is reproduced with this reproduction device 200, during normal reproduction the image data is reproduced as it is, including frames that are adversely affected by flash, and during special reproduction (such as during pause or slow motion reproduction) the image data can be reproduced after first subjecting any frames that are adversely affected by flash to correction processing. This reduces how pronounced the image data affected by flash is during special reproduction.

Features of Imaging Device

Features of the imaging device 100 described above will be compiled below.

(1) With the imaging device 100, the flash determination section 104 determines whether or not image data included in an image data group are affected by flash. Furthermore, the frame information for identifying image data by flash is added to the image data by the frame information adder 102. Therefore, which image data is affected by flash can be identified on the basis of the frame information added to the image data.

As discussed above, with this imaging device 100, an image data group can be produced such that image data affected by flash can be identified.

Also, since the original image data is recorded, there is no loss of important images, and all of the image data can be used in processing at the stage of editing a captured moving picture.

(2) Also, with the imaging device 100, even if image data is affected by flash, the original image data can be recorded directly, without undergoing processing and correction. Therefore, there is no loss of frames or duplication of frames (such as in copying), and the same image can be used in a variety of reproduction methods as a continuous image having a natural time flow. Consequently, when a continuous image used in reproduction is treated as an ordinary moving picture (that is, in the case of normal reproduction), there will be almost no unnaturalness as mentioned above, and the image data group can be used directly, without subjecting the image to correction processing or the like.

(3) The flash determination section 104 determines whether or not second image data is affected by flash by comparing the brightness in the same regions of the above-mentioned first and second image data, for example. This means that whether or not image data is affected by flash can be determined accurately.

(4) The frame information adder 102 adds frame information to a specific region within the image data. More specifically, the frame information adder 102 adds frame information to a non-display region that is different from the active display region used for display out of the image data. Therefore, frame information can be included in part of the image data, and this specific region of the image data can be checked to easily determine whether or not that image data is affected by flash.

Features of Reproduction Device

The features of the reproduction device 200 described above will be compiled below.

(1) With this reproduction device 200, frame information indicating the image data is affected by flash is detected from the image data by the frame information detector 204. The image data to which frame information is added is subjected to specific processing by the signal processor 202. Therefore, image data affected by flash can be identified from the image data group, so the image data affected by flash will not be so pronounced when the image data group is reproduced.

(2) When the detection result of the frame information detector 204 indicates that image data is affected by flash, the signal processor 202 is configured to execute correction processing for reducing the effect of flash on the image data. Therefore, the effect of flash during reproduction will not be so pronounced.

(3) When an image data group is treated as a moving picture in special reproduction (such as pause, frame advance, slow motion, or the like), the upper or lower region of the display image including blown-out highlights due to flash may stand out when displayed. This tendency is particularly pronounced when the display time for a single image is relatively long.

With the reproduction device 200, however, when the detection result of the flash detector indicates that the image data is affected by flash, and the operation information indicates special reproduction, the signal processor 202 performs correction processing to reduce the effect of flash on the image data. An example of this correction processing is a method in which a frame adversely affected is replaced with the immediately prior frame that has not been adversely affected, for example. Alternatively, other possible correction methods include trimming the usable portion of the image data and using it as a still picture, or subjecting a blown-out highlights region to some kind of image processing during reproduction.

Therefore, the effect of flash is suppressed to be pronounced during special reproduction, in which the effect of flash tends to be more pronounced.

Similarly, when an image data group is reproduced in fast-forward mode, the display of frames is thinned out according to the reproduction speed, and if the timing of this thinning is adjusted and frames affected by flash are removed, then the effect of flash is suppressed to be pronounced during reproduction in fast-forward mode. Here, the image data may be subjected to correction processing to reduce the effect of flash by means of reproduction speed, thinning timing, or the like, or may be reproduced directly, without first undergoing correction processing.

Here, the special reproduction is one or both of the following: a first reproduction method in which an inputted image data group is reproduced by increasing the time width over the frame time width during image capture, and a second reproduction method in which an image data group whose frame time width during image capture is greater than the normal time width is reproduced without changing the time width. Examples of the first reproduction method include pause mode, frame advance mode, and slow motion mode. Examples of the second reproduction method include a method in which an image captured in slow motion is reproduced at that same speed.

(4) With a reproduction system thus constituted by the imaging device 100 and the reproduction device 200, image data affected by flash can be identified, so that the effect of flash is suppressed to be pronounced during reproduction.

Other Embodiments

Embodiments of the present invention are not limited to those given above, and various changes and modifications are possible without departing from the gist of the invention. Also, the above embodiments are basically just preferred examples, and are not intended to limit the present invention, its applications, or the scope of these applications.

(1) In the above embodiments, a CMOS was given as an example of an imaging element, but the imaging element does not have to be a CMOS, and need only be an imaging element with which it is difficult to make the charge storage time be the same for every pixel, that is, an imaging element with which the charge storage time varies with the region within the image.

(2) In the above embodiments, a video camera having a moving picture capture function was used as an example of an imaging device, but the imaging device is not limited to being a device capable of moving picture capture, and need only be a device having the function of acquiring a continuous image, such as a still picture sequential capture function, for example.

(3) In the above embodiments, the flash determination section 104 was used as an example of the flash determination section, but the configuration of the flash determination section is not limited to that of the above-mentioned flash determination section 104. For example, the flash determination section 104 performs detection processing on image data outputted by the imaging section 101, but the flash determination section 104 may perform determination processing on image data outputted by the signal processor 102.

(4) In the above embodiments, frame information is recorded along with image data during image capture, and during reproduction it is determined if there is any image data affected by flash on the basis of frame information, but flash determination and the addition of frame information may be performed in subsequent processing on an image that has already been recorded. That is, if there are a flash determination section, a frame information adder, and an addition controller, the imaging section may be omitted from the image production device, for example.

(5) In the above embodiments, an example was given in which comparison of brightness at the same positions between adjacent frames was performed in the flash determination step, but the comparison may instead be made between frames that are not adjacent, and have a few frames in between. Also, the regions between compared need not be the same pixel positions, and whether or not image data is affected by flash may be determined by comparing the average values for the same areas, such as the average values for the same lines.

(6) In the above embodiments, the imaging section 101 has one imaging element 110, but the number of imaging elements is not limited to that in the above embodiments. For example, the imaging device may employ a three plate system. In this case, flash determination may be performed by the flash determination section on each set of image data outputted from a plurality of imaging elements, or flash detection may be performed on an image obtained from a representative imaging element, such as a G channel image.

(7) In the above embodiments, the flash that affects the image can be one or both of the following: an external flash provided to a device other than the imaging device (a flash emitted regardless of the operation of the imaging device), and an internal flash provided to the imaging device (a flash emitted under control by the imaging device). For example, with an internal flash, if the internal flash has the function of being linked to the camera, frame information can be added to the image by synchronizing with the signal when the flash is emitted.

(8) Furthermore, frame information may be used for scene searching. In general, scenes in which a flash is emitted are those of most importance, and are usually snapped at just the right moment. Therefore, if scene information is utilized to search for scenes of the greatest importance, an improvement in search efficiency can be anticipated. For example, when the user searches for a scene in which the flash is emitted in an image data group (moving picture) recorded by the imaging device 100, the search conditions may be set so that user operates the reproduction operation section 206 and frames in which the flash is emitted are found. The search conditions here are that image data is selected in which is embedded frame information indicating that a flash is emitted (that is, that the image data is affected by flash).

When the frame information detector 204 detects frame information added to image data, the detection result is outputted to the controller 205. From the detection result, the controller 205 selects frame information indicating that a flash is emitted, and reproduction is performed by outputting to the output section 208 from every frame after the one corresponding to the selected image data (or from before a specific frame based on the frame corresponding to the selected image data), and correction processing is performed to eliminate or reduce the adverse effect of flash on this image data.

With this reproduction device 200, scenes of greater importance can be searched for at high speed, based on embedded frame information, by reproducing a moving picture. This allows a high-visibility part of a video picture to be searched for quickly.

General Interpretation of Terms

In understanding the scope of the present disclosure, the term "comprising" and its derivatives, as used herein, are intended to be open ended terms that specify the presence of the stated features, elements, sections, groups, integers, and/or steps, but do not exclude the presence of other unstated features, elements, sections, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

The term "configured" as used herein to describe a section, section, or part of a device implies the existence of other unclaimed or unmentioned sections, sections, members or parts of the device to carry out a desired function.

The terms of degree such as "substantially", "about" and "approximately" as used herein mean a reasonable amount of deviation of the modified term such that the end result is not significantly changed.

What is claimed is:

1. A reproduction device, comprising:
a frame information detector configured to detect, from image data included in an image data group, frame information indicating that the image data is affected by flash; and
a signal processor configured to perform specific processing on image data to which the frame information is added,
wherein the signal processor performs correction processing for reducing how pronounced the effect of flash on the image data is during reproduction, based on an indication that the reproduction device is to reproduce the image data by a special reproduction method and a detection result of the frame information detector indicating that the image data that is to be reproduced in the special reproduction method indicated is affected by flash.

2. The reproduction device according to claim 1, further comprising
an operation section configured to receive a reproduction mode setting from the user and outputting operation information, wherein
the signal processor performs the correction processing for reducing how pronounced the effect of flash on the image data is during reproduction, when the operation information indicates the special reproduction method and when the frame information detector gives a detection result indicating that the image data is affected by flash.

3. The reproduction device according to claim 1, wherein
the special reproduction method includes one of a first reproduction method and second reproduction method,
in the first reproduction method, an image data group including a plurality of sets of the image data is reproduced by increasing the time width over the frame time width during image capture, and
in the a second reproduction method, an image data group whose frame time width during image capture is greater than the normal time width is reproduced without changing the time width.

4. The reproduction device according to claim 1, further comprising
an operation section configured to receive a reproduction mode setting from the user and outputting operation information, wherein
the signal processor performs at least one of reproduction processing for excluding the image data affected by flash and correction processing for reducing how pronounced the effect of flash on the image data is during reproduction, when the operation information indicates fast-forward reproduction, and the frame information detector gives a detection result indicating that the image data is affected by flash.

5. The reproduction device according to claim 1, wherein
the frame information detector is configured to detect the frame information added to a specific region within the image data.

6. The reproduction device according to claim 1, wherein
the frame information detector is configured to detect the frame information added to a non-display region different from an active display region used as a display image out of the image data.

7. The reproduction device according to claim 1, wherein
the frame information adder is configured to detect the frame information superposed over the active display region used as a display image out of the image data.

8. A reproduction system, comprising:
an image production device having a flash determination section configured to determine whether or not image data included in an image data group are affected by flash, a frame information adder configured to add frame information for identifying the image data affected by flash to the image data, and an addition controller configured to control the frame information adder to add the frame information to the image data affected by flash, on the basis of the determination result of the flash determination section;
a frame information detector configured to detect, from image data included in the image data group, frame information indicating that the image data is affected by flash; and
a signal processor configured to perform specific processing on image data to which the frame information is added,
wherein the signal processor performs correction processing for reducing how pronounced the effect of flash on the image data is during reproduction, based on an indication that the reproduction device is to reproduce the image data by a special reproduction method and a detection result by the frame information detector indicating that the image data that is to be reproduced in the special reproduction method indicated is affected by flash.

9. A reproduction method, comprising:
detecting, with a frame information detector, frame information indicating that image data is affected by flash; and
performing specific processing with a signal processor on image data to which the frame information is added,
wherein the signal processor performs correction processing for reducing how pronounced the effect of flash on the image data is during reproduction, based on an indication that the reproduction device is to reproduce the image data by a special reproduction method and a detection result by the frame information detector indicating that the image data that is to be reproduced in the special reproduction method indicated is affected by flash.

* * * * *